Patented June 26, 1951

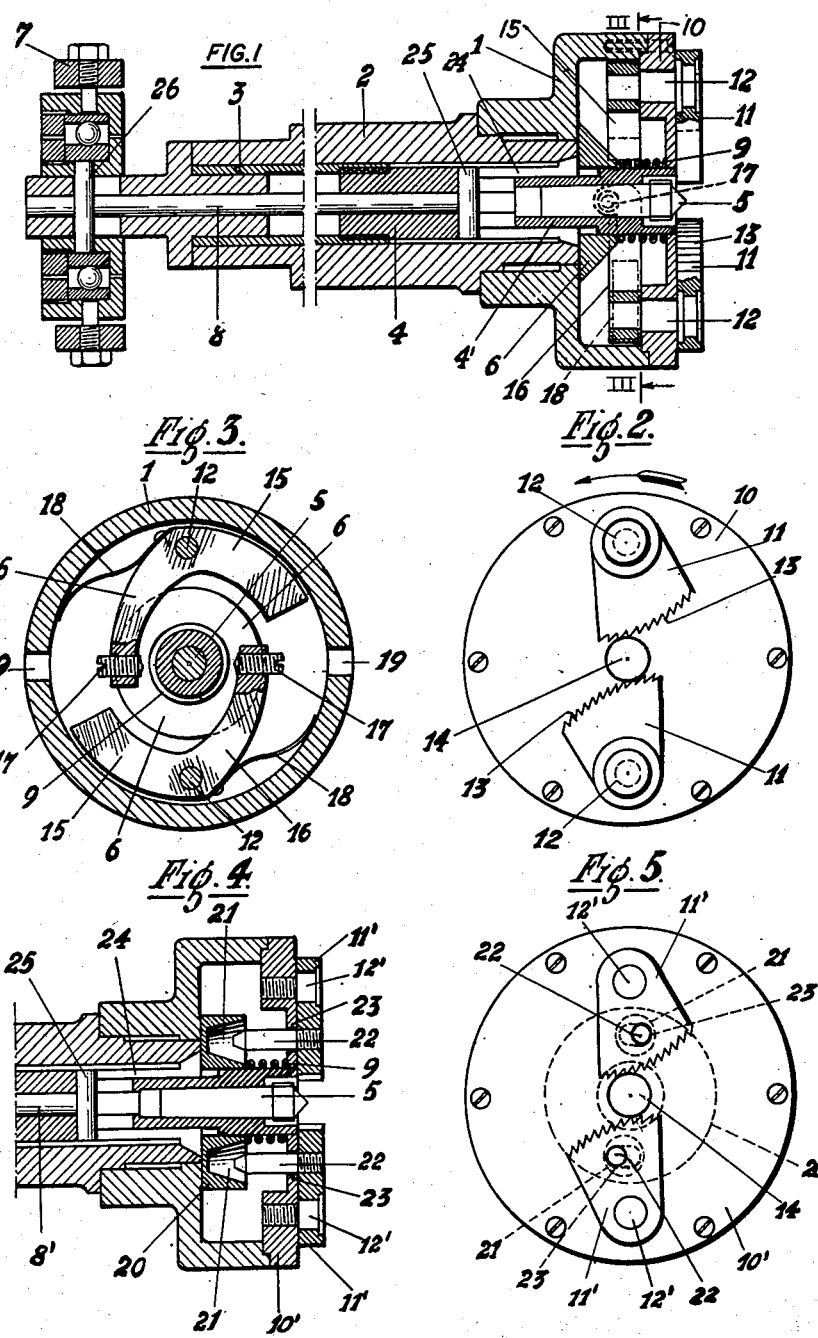

2,558,252

UNITED STATES PATENT OFFICE 2,558,252

AUTOMATIC DRIVING DEVICE FOR MACHINE TOOLS

Eduard Ifanger, Uster, Switzerland, assignor to Edouard Dubied & Cie., S. A., Neuchatel, Switzerland Application August 3, 1946, Serial No. 688,275
In Switzerland August 28, 1945

4 Claims. (Cl. 279—33)

1

The present invention relates to an automatic chuck for machine tools, especially lathes, having at least two gripping dogs mounted on the headstock and gripping the piece of work by the action of centrifugal force.

In the chuck according to the invention, the dogs are provided with adjustment members bearing against an axially movable, conical member which can be moved manually against the action of a spring for disengagement of the dogs from the work. When the conical member is returned to its rest position the dogs or gripping jaws are free to be independently pressed against the work by centrifugal force and the reaction of the turning operation.

One embodiment of the invention and a modification thereof are illustrated in the drawings, in which Fig. 1 shows a chucking device according to the invention in a longitudinal section;

Fig. 2 is a front view of the device shown in Fig. 1;

Fig. 3 is a cross section through the device taken along line III—III in Fig. 1;

Fig. 4 is a longitudinal section through a modified chuck according to the invention, and Fig. 5 is a front view of the chuck shown in Fig. 4.

In the drawings, the chuck is shown as used in a lathe, only those parts of the headstock being illustrated which are absolutely necessary for the understanding of the invention, other parts being omitted. A case 1 is mounted on the front end of the hollow spindle 2 of the lathe. A member 4 is screwed in the sleeve 3 lining the bore of the spindle. The pointed live center 5 of the lathe is guided in an extension 4' of member 4 which extension extends through the interior of the headstock and simultaneously serves as a guide for a concentric cone 6. A transverse pin 25 is situated in a transversal slot in member 4 at the forward end of a central rod 8 which is longitudinally movable in member 4, the latter having two longitudinal diametrically disposed slots accommodating two axially movable keys 24, the outer ends of which bear against the base of cone 6. A disengagement mechanism 7 of conventional design is situated at the rear end of the spindle and comprises a transverse member 26, by means of which rod 8 can be moved in axial direction. Case 1 is closed at the front by a lid 10. Between this lid and cone 6 a helical spring 9 is inserted which surrounds the extension 4' and tends to press cone 6 and rod 8 backwards, i. e. to keep it in the illustrated

2 initial or rest position. Two pins 12 are arranged diametrically opposite to each other in the lid 10, the gripping jaws 11 being attached to the outward ends of pins 12. These jaws have, opposite each other, eccentrically curved and toothed clamping surfaces 13 for gripping the work 14. Due to the eccentric shape of the gripping surfaces 13 pieces of work of various diameters can securely be clamped between them. Swinging arms 16, provided with counterweights 15 are fixed on the pins 12 inside the case 1. Adjusting screws 17, which with their inner pointed ends are positioned diametrically opposite to each other and bear against the circumference of cone 6, are screwed in the ends of arms 16. Flat springs 18, attached to the arms 16, bear against the inner wall of case 1 and press the arms 16 towards the axis of rotation of the chuck and hold the gripping jaws or dogs 11 in closed position. By moving rod 8 to the right, as seen in Fig. 1, cone 6 is pressed in the same direction, and this causes a swinging of the arms 16 into a position in which the gripping jaws are open. The gripping range of the jaws can be altered by adjusting the screws 17. The mode of operation of the device described is as follows:

In order to grip a piece of work the disengagement device 7 is manipulated and cone 6 is moved forward by means of the rod 8 and the keys 24 against the action of spring 9. The arms 16 are thus moved outwards and the gripping jaws 11 opened. Thereupon the work 14 is placed on the live center 5 and the disengagement device 7 allowed to return to its initial position. Consequently, cone 6 is returned to its initial position by the action of spring 9, and the arms 16 are swung inwards by the flat springs 18, until the toothed clamping surfaces 13 of the gripping jaws 11 engage the piece of work 14 and grip it. Clamping and securely holding the work between the gripping jaws 11 is effected by the centrifugal action of the counterweights 15 and by the reaction of the resistance of the work 14 to the turning operation, whereby the teeth of the clamping surfaces 13 bite into the work. By adjustment of screws 17, which can be reached by a screw driver through holes 19 in case 1 (Fig. 3), the distance between the clamping surfaces can be adapted to the diameter of the work to be machined so that the distance between the clamping surfaces when in open position is about 2 mm. greater than the diameter of the work and the latter can be easily inserted between the gripping jaws 11.

Instead of the external cone 6, just described, a guide ring with internal conical surfaces may be used as illustrated in Figs. 4 and 5. The design of spindle 2 with member 4 and extension 4' and of case 1 is substantially the same as that described above. Two pins 12', diametrically opposite to each other, are screwed in the lid 10' of the case, and the gripping jaws 11' which serve at the same time as centrifugal weights and are provided with toothed clamping surfaces 13 in the same manner as described above, are supported on the outer ends of the pins 12'. A guide ring 20 having two frustoconical cavities 21 can be moved forward by the longitudinal keys 24 against the action of spring 9 and is arranged concentrically around the extension 4'. Pins 22 which are situated parallel to the rotation axis and on a diameter of the device extend into the frustoconical cavities 21 through slots 23 in the lid of case 1 and are screwed as adjustment members into the gripping jaws 11'. Pins 22 are engaged by the inner conical surfaces of cavities 21 in ring 20 when the latter is moved to the right and cause disengagement of dogs 11' from the work. By screwing the pins 22 inwards or outwards, an adjustment of the distance between the eccentric surfaces of the dogs can be achieved similar to that in the first embodiment.

Since in both embodiments the gripping clamping surfaces 13 are not rigidly coupled with each other by an adjustment ring but move wholly independently of each other towards the piece of work to be gripped, a secure support of both gripping jaws against centred as well as against eccentric pieces of work is guaranteed.

In the embodiment according to Figs. 4 and 5 eccentric heads may also be provided at the inner end of the adjustment pins 22 and the pins rotatably arranged in the jaws in order to perform an adjustment of the movements of the gripping jaws.

In lathes with a spindle without a bore the described device may, in a similar manner, be arranged at the end of the spindle. More than two gripping jaws may of course be provided.

I do not limit my invention to the structure shown and described as modifications, within the scope of the appended claims, may be made without departing from the spirit of my invention. Having thus described my invention what I claim as new and desire to secure by Letters Patent is:

1. An automatic chuck for machine tools, particularly lathes, comprising, in combination, a head member; work engaging means individually pivoted on said head member; and disengaging means comprising resilient means and a control member having a conical surface portion and being movable against the action of said resilient means substantially transversely to the movement of said work engaging means for disengaging the latter from the work; each of said work engaging means comprising means abutted by said conical surface portion upon movement thereof, said last mentioned means being adjustable and affording individual adjustment of the position of said work engaging means relative to the head member.

2. An automatic chuck for machine tools, particularly lathes, comprising, in combination a head member; work engaging means individually pivoted on said head member; and disengaging means comprising resilient means and a control member having a conical surface portion and being movable against the action of said resilient means substantially transversely to the movement of said work engaging means for disengaging the latter from the work; each of said work engaging means comprising a pivot portion, a dog at one end of said pivot portion, an arm at the other end of said pivot portion and having a free end portion, and an adjustment screw screwed into said free end portion and having an end adapted to be abutted by said conical surface portions.

3. A chuck as defined in claim 2, comprising resilient means interposed between said head member and the distal side of said arm with respect to said end of said screw.

4. An automatic chuck for machine tools, particularly lathes, comprising, in combination, a head member; work engaging means individually pivoted on said head member; and disengaging means comprising resilient means and a control member having conical surface portions and being movable against the action of said resilient means substantially transversely to the movement of said work engaging means for disengaging the latter from the work; each of said work engaging means comprising a pivot portion and a dog extending from one end thereof and transversely to its rotation axis, and a member adjustably connected with said dog and having an end portion adapted to be abutted by one of said conical surface portions.

EDUARD IFANGER.

REFERENCES CITED

The following references are of record in the file of this patent:

UNITED STATES PATENTS

| Number | Name | Date |
|---|---|---|
| 141,593 | Root | Aug. 5, 1873 |
| 1,149,148 | Miller | Aug. 3, 1915 |

FOREIGN PATENTS

| Number | Country | Date |
|---|---|---|
| 511,975 | Great Britain | Aug. 28, 1939 |
| 526,948 | France | of 1921 |